W. H. FRENCH.
PROPULSION MEANS FOR VEHICLES.
APPLICATION FILED OCT. 29, 1920.
1,392,565.  Patented Oct. 4, 1921.
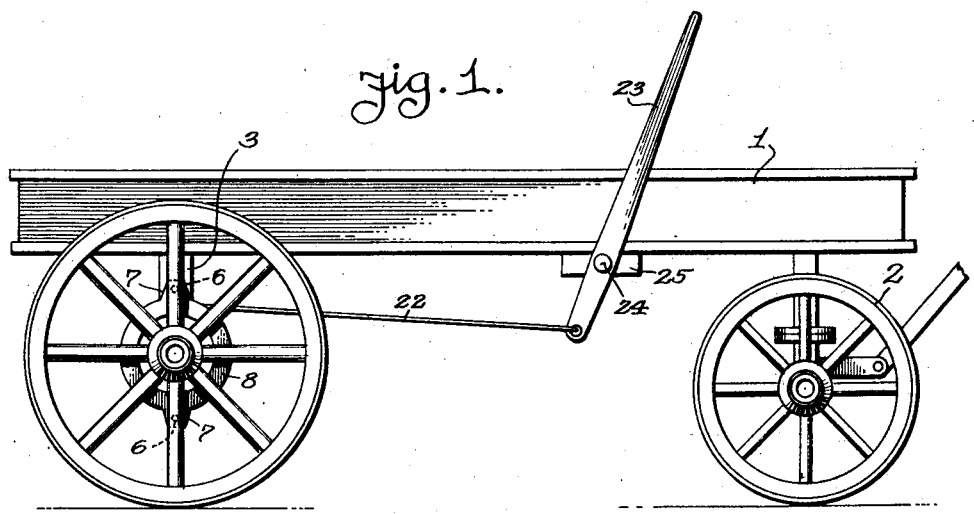
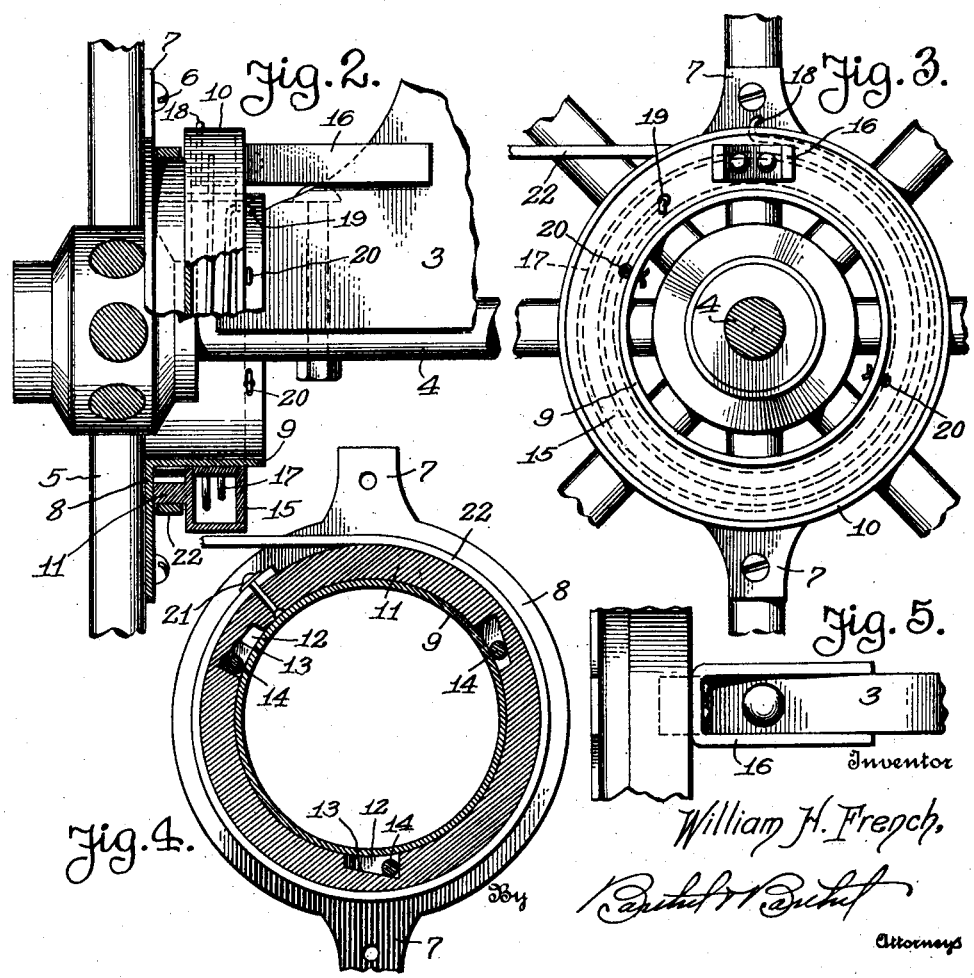

UNITED STATES PATENT OFFICE.

WILLIAM H. FRENCH, OF DETROIT, MICHIGAN.

PROPULSION MEANS FOR VEHICLES.

1,392,565. Specification of Letters Patent. Patented Oct. 4, 1921.

Application filed October 29, 1920. Serial No. 420,375.

*To all whom it may concern:*

Be it known that I, WILLIAM H. FRENCH, a citizen of the United States of America, residing at Detroit, in the county of Wayne and State of Michigan, have invented certain new and useful Improvements in Propulsion Means for Vehicles, of which the following is a specification, reference being had therein to the accompanying drawings.

This invention relates to propulsion means for vehicles, and has special reference to a mechanism that may be applied to small wagons, go-carts and wheeled structures or devices used by juveniles, so that the small vehicle may be manually propelled.

The propulsion is constructed so that it may be applied to either or both of the rear wheels of a wagon and operated by the occupant of the wagon, without any danger of the operator having the fingers or limbs injured during such operation. The mechanism is applicable to wagons already in use and may be easily and quickly installed. It includes a novel overrunning clutch, a drum, a flexible member, and an oscillatory member, all of which are compactly assembled and of such a nature that a child cannot readily tamper with the mechanism and injure the same. The oscillatory members provide the single means of operating the mechanism and by using a single member operatable with one hand the other hand is free for steering or guiding the wagon.

The construction entering into my invention is hereinafter described in connection with the drawing, wherein—

Figure 1 is a side elevation of a small wagon provided with the propulsion mechanism;

Fig. 2 is an enlarged detail view of a portion of one of the rear wheels of the wagon showing the mechanism partly broken away and partly in section;

Fig. 3 is a view of the mechanism as carried by the inner side of the wheel;

Fig. 4 is a longitudinal sectional view of a portion of the mechanism showing the overrunning clutch, and Fig. 5 is a plan of a portion of the mechanism showing its relation to a bolster of the wagon.

In the drawing, the reference numeral 1 denotes a wagon bed or body having a front steerable truck 2, and the rear end of the wagon body is supported by the rear truck including a bolster 3, an axle 4, and wheels 5.

Mounted on the inner face of one of the wheels 5 and preferably secured to some of the spokes thereof by screws 6 or other fastening means are apertured ears 7 forming part of a peripheral flange 8 on an inwardly projecting drum 9, said drum being disposed about the axle 4 and the hub of the wheel 5.

Loose on the drum 9 is a cylindrical casing having one end thereof open and the opposite end thereof provided with a clutch member 11 which is loose about the drum 9, but adapted to be clutched relative thereto. The inner wall of the clutch member 11 has a plurality of equally spaced tapering recesses 12 and these recesses afford inclined walls 13 which confront the periphery of the drum 9. In the recesses 12 are placed shiftable clutch members 14, preferably in the form of rollers or balls which may be wedged in the small ends of the recesses 12 to bind the clutch member 11 relative to the drum 9 and cause the drum to revolve with the clutch member 11 when rotated in one direction, otherwise the clutch member 11 is free to rotate relative to the drum 9. This is best understood by reference to Fig. 4 where it will be noted that the clutch member 11 and the drum 9 may rotate together in a counter clockwise direction and the clutch member 11 may rotate independently of the drum 9 when turned clockwise. This construction constitutes an overrunning or one-way clutch, the purpose of which will hereinafter appear.

Loose on the drum 9 and fitting in the open end of the cylindrical casing 10 is a stationary closure member 15 and riveted or otherwise connected to said closure member is a channel shaped strut 16 adapted to fit on the bolster 3 and prevent rotation of the closure member relative to said bolster. The closure member 15 coöperates with the casing 10 in providing an inclosure or housing for a coiled spring 17 which has its outer convolution suitably connected to the casing 10, as at 18, and its inner convolution suitably connected to the closure member 15. One end of the spring is therefore held so that the spring may be wound or placed under tension and to prevent the spring from shifting the closure member 15 outwardly on the inner end of the drum 9, said drum has its inner end provided with one or more stops 20 which may be in the form of cotter pins or staples, as best shown in Fig. 3.

Suitably attached to the periphery of the clutch member 11, as at 21, is the rear end of a flexible member 22, preferably in the form of a strap which will snugly embrace the periphery of the clutch member 11. The opposite end of the flexible member 22 is carried forwardly and suitably attached to the lower end of an oscillatory member or lever 23, pivotally mounted as at 24, on a bearing or bracket 25, carried by the wagon body 1. The oscillatory member or lever 23 extends upwardly at the side of the wagon body convenient to any occupant thereof so that the upper end of the member or lever may be gripped with one hand and moved back and forth.

Assuming that the operator pulls rearwardly on the upper end of the oscillatory member or lever 23, the flexible member 22 is unwound relative to the clutch member 11, and such movement of the clutch member 11 causes the drum 9 to rotate therewith and impart movement to the wheel 5. This is brought about, as set forth in the beginning by the clutch members 14 establishing rotative continuity between the drum 9 and the clutch member 11. It is now apparent that pulling upon the lever 23 causes the wagon 20 to move forward and such rotative movement of the drum 9 causes the spring 17 to be placed under tension, whereby the retractile force of the spring may rotate the clutch member 11 independent of the drum 9 and cause the flexible member 22 to be retracted and again wound on the clutch member 11, thus restoring the oscillatory member or lever 23 to its forward position ready for another propelling stroke.

I attach considerable importance to the simplicity of construction entering into the propulsion mechanism, and while in the drawing there is illustrated the preferred embodiments of my invention, it is to be understood that the structural elements are susceptible to such variations and modifications as fall within the scope of the appended claims.

What I claim is:—

1. In a propulsion mechanism for a vehicle, having an axle, a wheel drum, a casing loose on said drum and adapted to impart movement to said wheel drum, a stationary closure for said casing, means in said casing attached to said stationary closure adapted for rotating said casing in one direction, said drum, casing and closure being concentrically disposed about the vehicle axle, and means adapted for rotating said casing in an opposite direction.

2. A propulsion mechanism as in claim 1, characterized by the last mentioned means including a flexible member attached to and wound on said casing, and a lever attached to said flexible member and pivotally supported in the same vertical plane as said casing.

3. In a manually propelled vehicle, a bolster, a drive wheel at one end of said bolster, a casing supported from said wheel and adapted to impart movement thereto, a stationary member attached to said bolster and extending into said casing, means on said casing adapted for rotating said casing in one direction, and means connecting said casing to said stationary member adapted for rotating the casing in an opposite direction.

4. The combination with a wagon having a body, a bolster, and rear wheels, of a drum carried by one of the said wheels, a casing loose on said drum, a clutch associated with said casing adapted to establish a driving relation between said casing and said drum, a stationary member held against rotation by said bolster, a coiled spring in said casing connecting said casing and said stationary member and adapted to rotate said casing on said drum when released by said clutch, means on said clutch for rotating said clutch and imparting rotation to said drum, and means carried by said wagon body adapted for operating the last mentioned means.

In testimony whereof I affix my signature in presence of two witnesses.

WILLIAM H. FRENCH.

Witnesses:
KARL H. BUTLER,
ARTHUR MINNICK.